(12) United States Patent
Wu

(10) Patent No.: US 8,884,541 B2
(45) Date of Patent: Nov. 11, 2014

(54) DIMMING FOR CONSTANT CURRENT LED DRIVER CIRCUIT

(71) Applicant: RAB Lighting Inc., Northvale, NJ (US)

(72) Inventor: Mingliang Wu, Piermont, NY (US)

(73) Assignee: RAB Lighting Inc., Northvale, NJ (US)

( * ) Notice: Subject to any disclaimer, the term of this patent is extended or adjusted under 35 U.S.C. 154(b) by 0 days.

(21) Appl. No.: 14/069,508

(22) Filed: Nov. 1, 2013

(65) Prior Publication Data

US 2014/0125252 A1    May 8, 2014

Related U.S. Application Data

(60) Provisional application No. 61/721,766, filed on Nov. 2, 2012.

(51) Int. Cl.
*H05B 37/02* (2006.01)
*H05B 33/08* (2006.01)

(52) U.S. Cl.
CPC ............................... *H05B 33/0815* (2013.01)
USPC ........................... 315/219; 315/224; 315/307

(58) Field of Classification Search
USPC .................. 315/307, 308, 291, 224, 219, 276
See application file for complete search history.

(56) References Cited

U.S. PATENT DOCUMENTS

| | | |
|---|---|---|
| 6,013,988 A | 1/2000 | Bucks et al. |
| 6,147,458 A | 11/2000 | Bucks et al. |
| 6,975,079 B2 | 12/2005 | Lys et al. |
| 7,038,399 B2 | 5/2006 | Lys et al. |
| 7,135,824 B2 | 11/2006 | Lys et al. |
| 7,202,608 B2 | 4/2007 | Robinson et al. |
| 7,352,138 B2 | 4/2008 | Lys et al. |
| 7,358,681 B2 | 4/2008 | Robinson et al. |
| 7,420,335 B2 | 9/2008 | Robinson et al. |
| 8,278,832 B2 * | 10/2012 | Hung et al. .................... 315/219 |
| 8,384,295 B2 * | 2/2013 | Simi ............................. 315/219 |
| 2010/0176746 A1 * | 7/2010 | Catalano et al. .............. 315/297 |

* cited by examiner

*Primary Examiner* — David H Vu
(74) *Attorney, Agent, or Firm* — SmithAmundsen LLC; Dennis S. Schell; Kelly J. Smith

(57) ABSTRACT

An illustrative LED driver circuit includes dimming control of the LED lamp. The circuit uses flyback converter topology, a power factor correction (PFC) primary side controller, a secondary side controller that includes current control and voltage control regulation, and an dimming control circuit. The dimming control circuit includes a selectable dimming control signal added together with a sensed current output signal to provide a control signal supplied to the secondary controller for output current control.

20 Claims, 7 Drawing Sheets

DIMMING FOR CONSTANT CURRENT LED DRIVER CIRCUIT

CROSS-REFERENCE TO RELATED APPLICATIONS

This application is a non-provisional of and claims the benefit of U.S. Provisional Patent Application 61/721,766, filed Nov. 2, 2013, and titled Flyback LED Dimming and Driver Circuit, which is herein entirely incorporated by reference.

FIELD OF THE INVENTION

The present invention relates to LED driver circuits, and particularly, to a transformer coupled switching LED driver circuit incorporating dimming control.

BACKGROUND

Dimming control of lighting is desirable in order to provide adjustment of light levels and to reduce energy consumption. Prior art designs for LED drivers that provide dimming typically include control integrated circuits specially designed to provide dimming or require elevated circuit complexity and cost to accomplish dimming, including for example, to accommodate dimming via a control signal or TRIAC control of the AC supply.

Transformer coupled switching regulators are often used as LED driver circuits. One such type of driver circuit typically used for higher power LED lighting applications is a flyback converter, which achieves a relatively high level of efficiency. For dimming the average current supplied to the LEDs must be decreased. For example, the average current can be reduced by providing pulse width modulation (PWM); however, this can be difficult in a flyback converter, thus limiting the practical range of dimming available.

A flyback converter utilizing a power factor correction (PFC) controller, for example, a current-mode PFC controller operating in transition mode, provides an isolated, low cost, low component count supply to LEDs. Flyback converters with a PFC controller are especially advantageous with higher power LEDs to maintain high efficiency and reduce distortion of the supply line current. While such a driver circuit can be designed to efficiently provides a constant current for a specific LED load, providing dimming control by decreasing the current supplied by a constant current supply generally adds much more complexity and cost to the circuit.

It is therefore desirable to provide dimming control of an LED driver circuit utilizing a current-mode PFC controller without having to add expensive circuit components or complexity that increase the cost of implementing typical driver control configuration disclosed in the prior art.

SUMMARY

The present invention may comprise one or more of the features recited in the attached claims, and/or one or more of the following features and combinations thereof.

LEDs behave like a constant voltage load, so driver circuits for LEDs typically control current to provide a constant current supply. One common switching type LED driver configuration uses a flyback transformer, a PFC controller on the primary side, and a feedback signal from the load output of the secondary side. In this type of LED driver, the circuit being designed to provide a constant current helps to achieve a desired long lifespan reliability for the LEDs. In such a typical PFC flyback LED drive circuit the secondary side feedback can be provided by a secondary controller, for example, a voltage and current controller integrated circuit and associated components. Although other performance measures or conditions may also be monitored, a primary function of the secondary controller is to monitor the sensed output current and in response, provide a feedback signal to the primary controller. The feedback signal can be isolated by an optocoupler, providing better current control than is practical without isolation between the primary and secondary sides of the driver.

In normal, settled operation, the sensed current output signal is equal to 100% of the designed sensed current output signal when the current supplied to the LEDs is equal to the designed LED load current level. Thus, when the sensed current output signal is 100%, no error exists in the feedback signal between the secondary and primary controller, and the primary controller maintains the present control of the primary side power driver and the present current level supplied to the LED load. When the sensed current output signal is above or below the designed current level for the LEDs, the feedback signal provided to the primary controller will drive the current output to the LEDs down or up, as appropriate, toward 100% of the designed load current supplied to the LEDs.

To dim LEDs driven by such a circuit, the current supplied to the LEDs can be reduced from the designed current supply level; however, as discussed above, the driver circuit is designed to provide a constant current to the LEDs, so some modification of the circuit control scheme appears necessary. Advantageously, in order to adapt the constant current LED driver circuit arrangement for dimming, the sensed current output signal provided to the secondary controller can simply be modified to select dimming, thus leaving the remainder of the circuit, including the primary and secondary controllers, unchanged. More specifically, the sensed current signal can be artificially elevated by a dimming control signal, causing the feedback from the secondary controller to command the primary controller to reduce the current supplied to the LEDs, thus dimming the LEDs.

For example, if dimming to 50% of designed LED current is desired, the sensed current output signal is elevated by summing it with a dimming control signal equal to 50% of the designed sensed current output signal level. Thus, when the sensed current output signal is 50% of the designed current level and is summed with the dimming command signal, a summed control signal of 100% is provided to the secondary controller. In this example, as the dimming control signal is increased from zero to 50%, initially raising the summed control signal to over 100%, the feedback from the secondary controller will drive the current output to the LEDs downward. Thus, as the dimming control signal is increased to 50%, the feedback from the secondary control will adjust the primary controller so that current output and the sensed current output signal are decreased to 50% of normal. Similarly, if dimming to 75% is desired, the sensed current output signal is elevated by summing it with a dimming control signal set to 25% of the normal sensed current output signal, thus providing a summed control signal of 100% to the secondary controller when the actual current output to the LEDs is 75% of normal.

An illustrative LED driver circuit according to the present disclosure includes a dimming control circuit. The circuit uses flyback converter topology, a power factor correction (PFC) controller, a secondary controller providing feedback to the PFC controller, and a dimming control circuit. One illustrative LED driver circuit with dimming control includes a flyback converter, the output of the LED driver circuit provided by the flyback converter; a primary controller for controlling the flyback converter; a secondary controller providing output feedback to the primary controller; an output current sensing circuit; and a dimming control circuit coupled to the output current sensing circuit, the dimming control circuit providing a sensed current signal, a selectable dimming control signal, and a summed control signal, the summed control signal being the sum of the sensed current signal and dimming control signal; and wherein the summed control signal is coupled to the secondary controller.

The primary controller can be a PFC controller and the secondary controller can be a voltage and current controller. The primary and secondary controllers can operate to adjust a current output based on the summed control signal. The dimming control signal can be selectable between a range of zero and the value of the maximum sensed current signal. The primary and secondary controllers can operate to provide a current output that is reduced by the ratio of the dimming signal over the maximum sensed current signal. Each of the sensed current signal, dimming control signal, and summed control signal can comprise a voltage level.

The sensed current signal can provided as a control voltage output by a non-inverting op amp coupled to output current sensing circuit, and the summed control signal is a control voltage output of a summing op amp coupled to the sensed current signal and the dimming control signal. The output current sensing circuit can include a shunt resister on the low-side of the output of the LED driver circuit. The dimming control signal can vary between 0V and the voltage of the summed control signal for which a desired maximum current output is provided by the LED driver circuit. A summed control signal of 200 mV can provide a desired maximum current output; and the dimming control signal can vary between 0 and 200 mV. The LED driver circuit can further include a TRIAC dimming voltage input; and an op amp configured to scale the TRIAC dimming voltage to a desired voltage range for the dimming control signal.

Another illustrative embodiment of an LED driver circuit according to the present invention includes a transformer coupled switching regulator including a power driver coupled to a primary winding of the transformer; an output coupled to a secondary winding of the transformer; a primary controller for controlling the power driver; a secondary controller providing output feedback to the primary controller; an output current sensing circuit; and a dimming control circuit coupled to the output current sensing circuit and the secondary controller. The dimming control circuit can provide a sensed current signal, a selectable dimming control signal, and a summed control signal, the summed control signal being the sum of the sensed current signal and dimming control signal, and the summed current signal providing a current control signal to the secondary controller. The transformer coupled switching regular can be a flyback converter. The sensed current output signal can be in the form of a sensed control voltage. The dimming signal can be in the form of a dimming control voltage. The summed signal can be in the form of a summed controlled voltage.

Additional features of the disclosure will become apparent to those skilled in the art upon consideration of the following detailed description of the illustrative embodiment.

BRIEF DESCRIPTION OF THE DRAWINGS

The detailed description particularly refers to the accompanying figures in which.

DESCRIPTION OF THE ILLUSTRATIVE EMBODIMENTS

Figure 1:
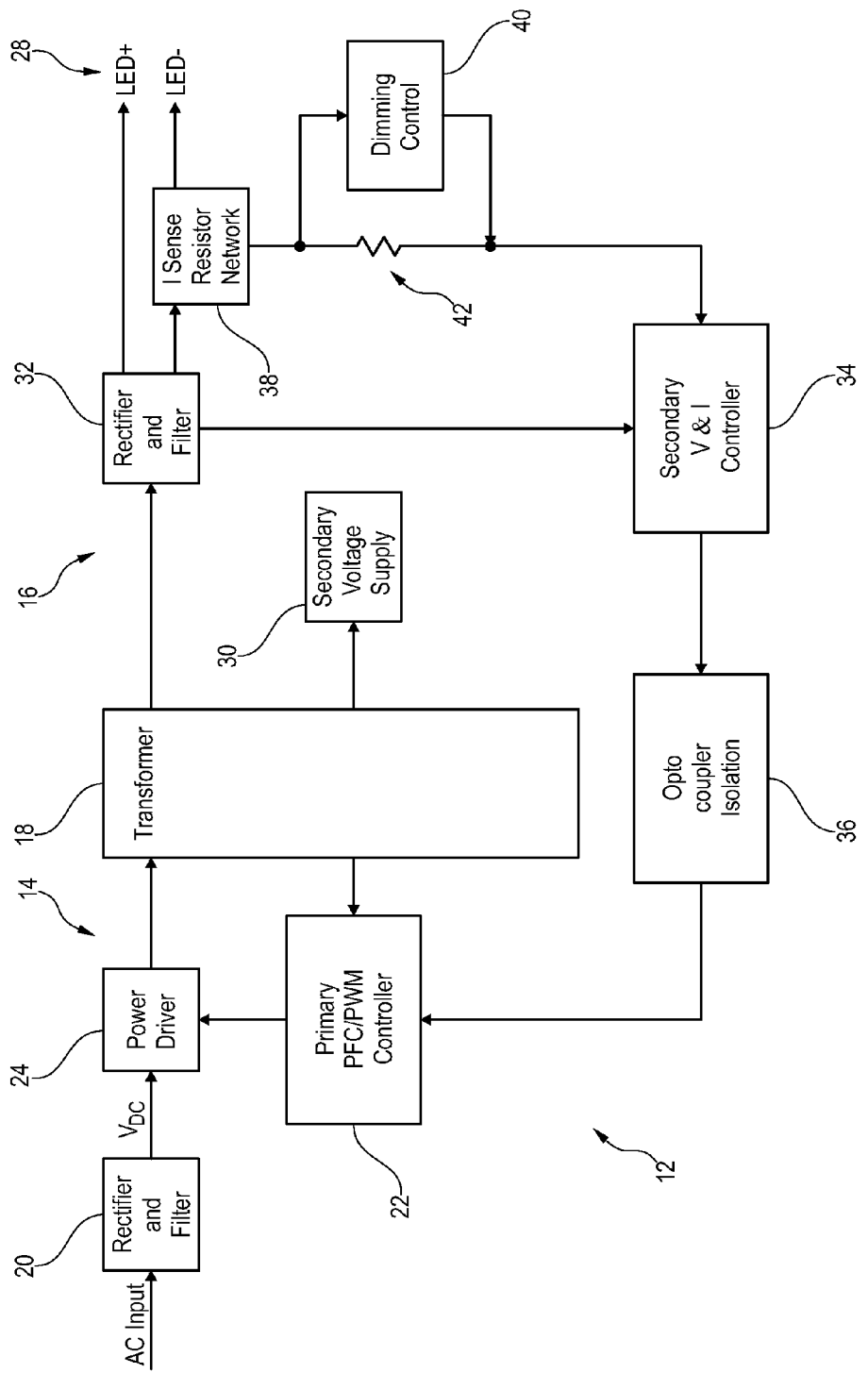
FIG. 1 is a schematic block diagram of an illustrative LED driver circuit according to the present invention.

For the purposes of promoting and understanding the principals of the invention, reference will now be made to one or more illustrative embodiments illustrated in the drawings and specific language will be used to describe the same.

An illustrative LED driver circuit 12 shown in FIG. 1 includes a primary side 14 and a secondary side 16 separated by a boost transformer 18. The primary side 14 includes an AC input, rectifier and filter 20, primary controller 22 controlling power driver 24. The secondary side 16 includes high and low side outputs 28 to LEDs (not shown), a secondary voltage supply 30 to power a secondary controller 34, rectifier and filter 32, current sensing resister network 38 associated with the low-side LED output, and dimming control circuit 40 coupled across resister 42, providing an input to secondary controller 34. The secondary controller 34 output provides feedback to primary controller 22 and is isolated between the secondary side 16 and the primary side 14 by optocoupler 36. An illustrative embodiment of the LED driver circuit 12 includes primary side 14 shown in FIG. 2, secondary side 16 shown in FIG. 3, and one of the illustrative dimmer control circuits 40 shown in FIGS. 4, 7, 9, and 10.

LED Driver with Flyback Transformer

Figure 2:
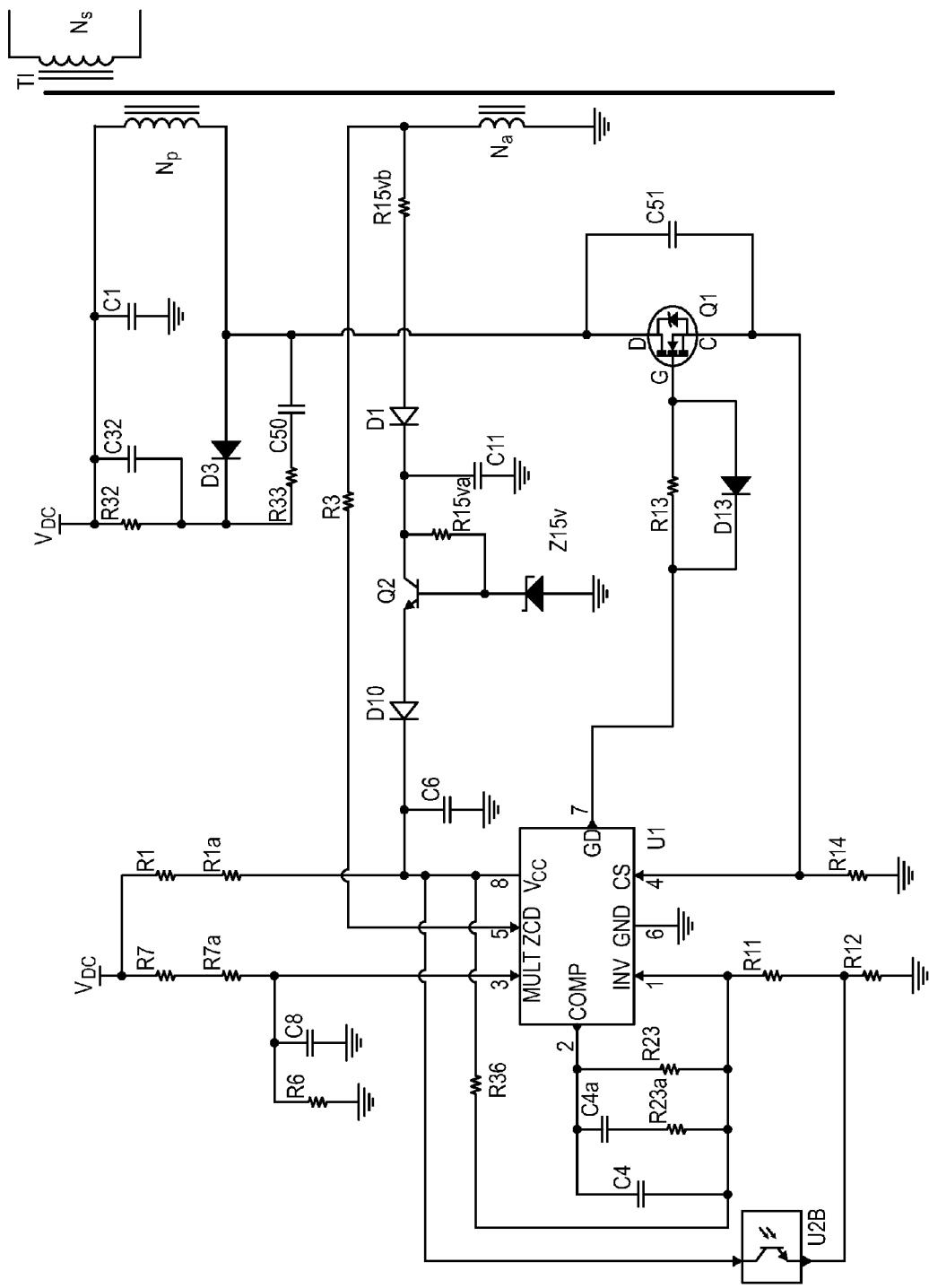
FIG. 2 is a schematic diagram of the primary side of the LED driver circuit of FIG. 1, including the power factor control portion of the LED driver circuit.

An illustrative embodiment of the primary side 14 of the LED driver circuit 12 is shown in FIG. 2. The illustrative embodiment of the LED driver circuit 12 the utilizes flyback topology and is based on a transition-mode PFC primary controller IC U1, for example an L656x series IC, for example, L6562, available from STMicroelectronics of Coppell, Tex. and Geneva, Switzerland.

A boost converter can be connected to the output of rectifier bridge diodes (not show). A flyback switch includes a MOS- FET Q1 and is driven by the primary controller IC U1. The boost transformer T1 provides the coupling between a primary side winding Np and a secondary side winding Ns. Diode D3 and R32/C32 circuit clamp the peak leakage inductance voltage spike at MOSFET Q1 turn-off.

Upon startup, primary controller IC U1 is powered by circuit voltage supply Vcc across capacitor C6, which is charged via resistors R1/R1a, from line rectified DC voltage Vdc. The auxiliary winding N2 of transformer T1 can be used to generate 15V Vcc for primary controller IC U1 during normal operation after startup.

Figure 3:
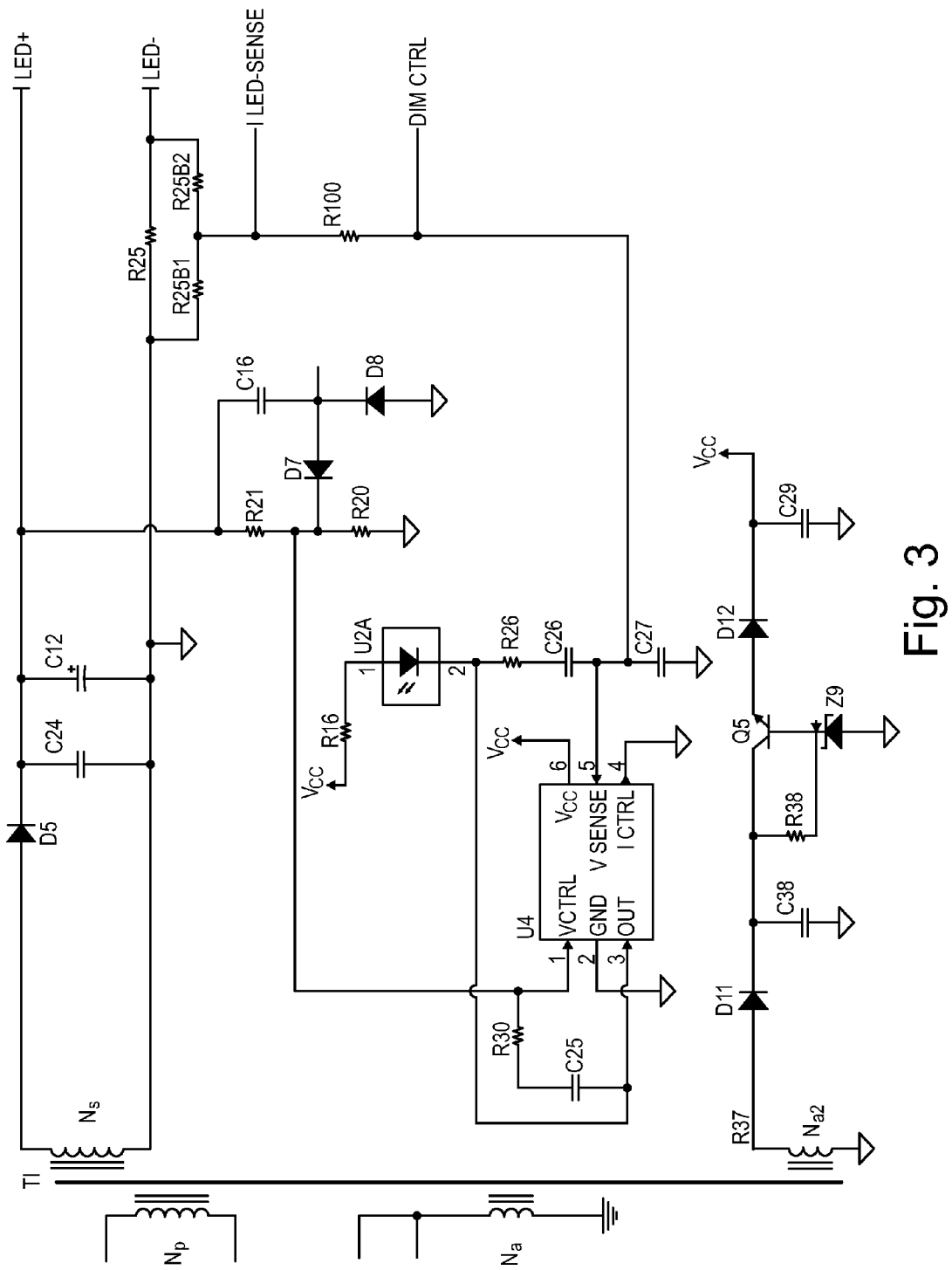
FIG. 3 is a schematic diagram of a secondary side of the LED driver circuit of FIG. 1, including the driver output portion, secondary controller, and dimming control circuit.

Resistor R3 is also connected to auxiliary winding N2 to provide a transformer signal to the L656x current sensing (ZCD) pin of primary controller IC U1, operating to turn on MOSFET Q1 at every switching cycle. The CS pin of primary controller IC U1 uses resistor R14 to sense the current flowing into the transformer primary side and through the MOSFET Q1. Once the signal at the current sense pin ZCD has reached the level programmed by an internal multiplier of the L656x, MOSFET Q1 is turned off by a gate drive (GD) pin of the primary controller IC U1. Voltage divider R7/R7a and R6 provides the primary controller IC U1 multiplier (MULT) pin with instantaneous voltage information which is used to modulate the current flowing into the transformer T1 primary side. An optocoupler IC U2A/U2B includes an output side U2B is located in the primary side of the circuit (FIG. 2), and an input side U2A located in the output/secondary side of the circuit (FIG. 3). Optocoupler U2A/U2B transmits a feedback signal, which is based at least in part on the dimming control signal, from secondary controller IC U4 (FIG. 3) of the secondary side 16 to the primary controller IC U1.

Flyback LED Driver Control Circuit

An illustrative embodiment of the secondary side 16 of the LED driver circuit 12 is shown in FIG. 3. An output rectifier diode D5 coupled to the secondary winding Ns of the boost transformer T1 is a fast recovery type diode. Capacitor C24 is coupled across the output to filter out high frequency ripple. The output voltage ripple frequency is twice the input, measured as 120 HZ. The resulting voltage ripple is less than 3.0% at the LED lamp and the current ripple is about 20% through LED lamp, without dimming.

The feedback signal, coupled to the primary side by optocoupler U2A/U2B, can be provided by a constant voltage and constant current controller (secondary side controller) IC U4, for example, TSM1052 available from STMicroelectronics of Coppell, Tex. and Geneva, Switzerland. The inputs to the secondary controller IC U4 include the output voltage sensed on the high side of the LEDs and a function of the current sensed on the low side of the output to the LEDs. Resistors R20 and R21 form a divider circuit to sense the high side output voltage available to drive the LED lamp. Current sensing (shunt) resistor R25 is part of a current sensing resistor network R25/R25b1/R25b2 that is coupled by resistor R100 to the Vsense, pin 5, of secondary controller IC U4. For example, to drive a 720 mA LED lamp, R25 is selected to be 0.278 Ohm, 1%, providing the 200 mV voltage needed at the secondary IC U4 Vsense inverting input, pin 5 for TSM1052 at 100% LED output.

The secondary controller IC U4 includes a dual control loop to perform current control and voltage control (CC and CV) regulation. The secondary controller IC U4 integrates a voltage reference, two Op Amps, and a low side current sensing circuit. The external components needed to complete the two control loops are a resistor divider that senses the output of the power supply and that fixes the voltage regulation set point at the specified value, and a sense resistor that feeds the current sensing circuit with a voltage proportional to the dc output current.

Dimming Control Principle and Test Circuit

At 100% of designed load, the LED lamp current is 720 mA passing through R25. The resulting sensed current output signal provides a control voltage of 200 mV at the Vsense, pin 5, of the secondary controller IC U4. For reasons which will become evident, the control voltage at Vsense, pin 5, of the secondary controller IC U4 is referred to as a summed control signal.

Advantageously, in order to provide dimming, the sensed current output signal provided to the secondary controller can simply be modified to select dimming More specifically, the sensed current output signal can be artificially elevated by a dimming control signal (a second control voltage), causing the feedback from the secondary controller to command the primary controller to reduce the current supplied to the LEDs, thus dimming the LEDs.

For example, adding a dimming control signal of 50 mV requires that the sensed current output signal be only 150 mV to provide a summed control signal of 200 mV. Thus, when the control circuit is balanced, only 150 mV is needed from R25, meaning the load current provided to the LEDs is reduced to 540 mA. A second example, adding a dimming control signal of 200 mV requires that the sense current output signal be 0 mV, meaning the load current is reduced to 0 mA (zero). A third example, to obtain a 10% dimming level, the dimming control signal can be 180 mV, giving a sensed current output signal 20 mV supplied from R25 that equals a 72 mA load current supplied to the LEDs, 10% of the full load current.

Figure 4:
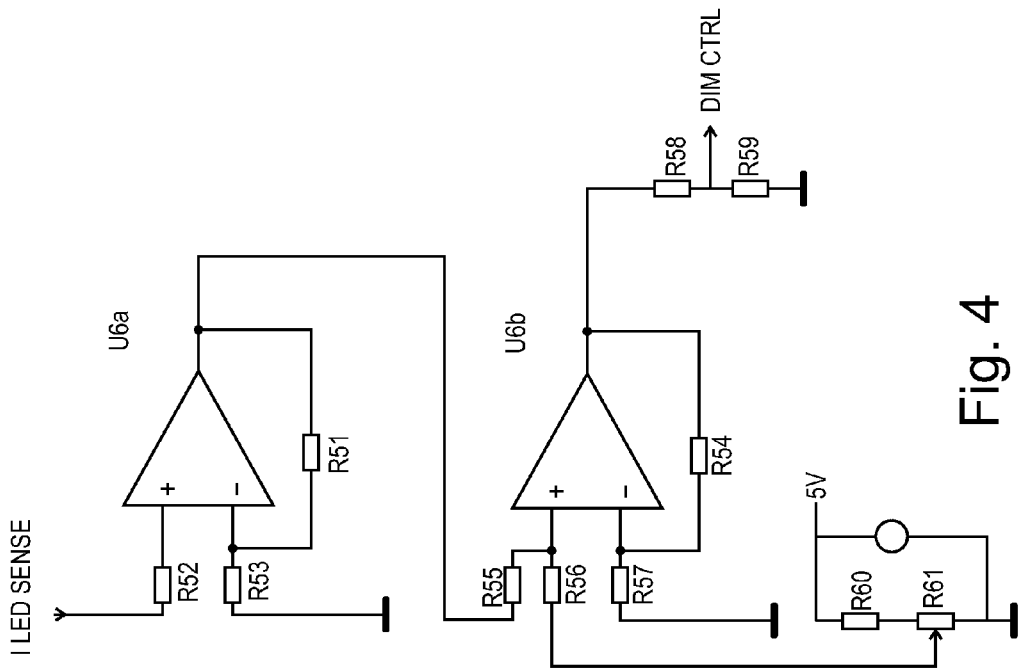
FIG. 4 is a schematic diagram of a first embodiment of a dimming control circuit portion of the LED driver circuit of FIG. 1.

This function of providing a summed control signal by adding a dimming control signal to the sensed current signal can be provided by the first embodiment of the dimming control circuit shown in FIG. 4. A non-inverting input of Op Amp U6A is coupled with resistor R25. The Op Amp U6A scales up the sensed current signal from by a factor of 10, for example, for 100% of designed load, from 200 mV to 2.0V. A voltage divider formed by resistors R60 and variable resistor R61 provides a selectable 0-2V voltage source, the dimming control signal. With a 5V DC supply, variable resistor R61 outputs a voltage from 0 to 2.0V when resistor R10 is 1.5 k ohm and resistor R11 is 1.0 k. Op Amp U6B operates as a summing amplifier, receiving and summing the sensed current output signal from the output of Op Amp U6A and the dimming control signal from variable resistor R61.

The output of Op Amp U6B is coupled with a voltage divider circuit formed by resistors R58 and R59, the output of which is the summed control signal that is connected to the Vsense, pin 5, of secondary controller IC U4. As the dimming control signal provided by selection of variable resistor R61 is increased, increasing the non-inverting pin of Op Amp U6B, the LED load current is forced to decrease.

Figure 5:
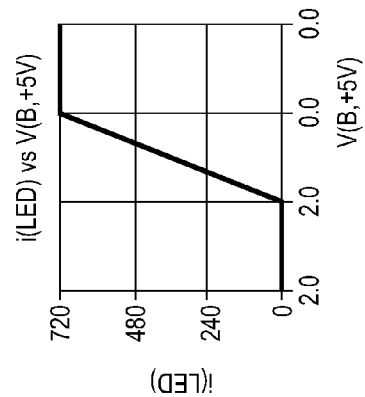
FIG. 5 is a graph illustrating the relationship between output (load) current and second source control (signal) voltage for the LED driver circuit of FIG. 1 with the dimming control circuit of FIG. 4.
Figure 6:
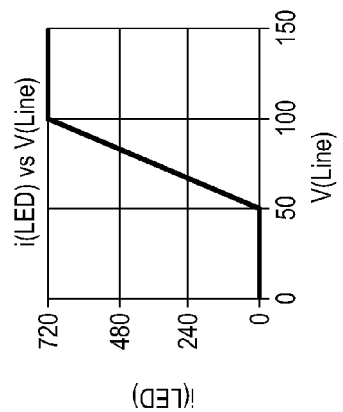
FIG. 6 is a graph illustrating the relationship between the output (load) current and supply (line) voltage for the LED driver circuit of FIG. 1 with the dimming control circuit of FIG. 4.

A dimming control signal of 0V output from variable resistor R61 represents a line voltage in the 150V to 100V range. A dimming control signal of 2.0V output from variable resistor R61 represents a line voltage in the 0V to 50V range. A dimming control signal between 0-2.0V output from variable resistor R61 represents a line voltage in the 100V to 50V range, with reversed linear relationship. Table 1, below, illustrates this reversed linear relationship. FIG. 5 illustrates the relationship between the output (LED load) current and the supply (line) voltage. FIG. 6 illustrates the relationship between the output (LED load) current and the dimming control signal, V (B, +5V).

Illustrative gains of the circuits for Op Amps U6A and U6B shown in FIG. 4 can be, for example, GA=10 and GB=1. With GA=10, the sensed current signal is converted from 200 mV to 2.0V. When the dimming control signal is 0V, the LED current equals 720 mA. When the dimming control signal is 2.0V, the LED current equals 0 mA.

TABLE 1

Voltage Relationships for 0-2.0 V dimming control circuit:

| I(LED) | Sense(A) | V(U6B, +5 V) | V (Line) |
|---|---|---|---|
| 0 | 0 | 2.0 | 0.0 |
| 0 | 0 | 2.0 | 50.0 |
| 720 mA | 200 mV | 0.0 | 100.0 |
| 720 mA | 200 mV | 0.0 | 150.0 |

0-10V Dimming Control Circuit

Figure 7:
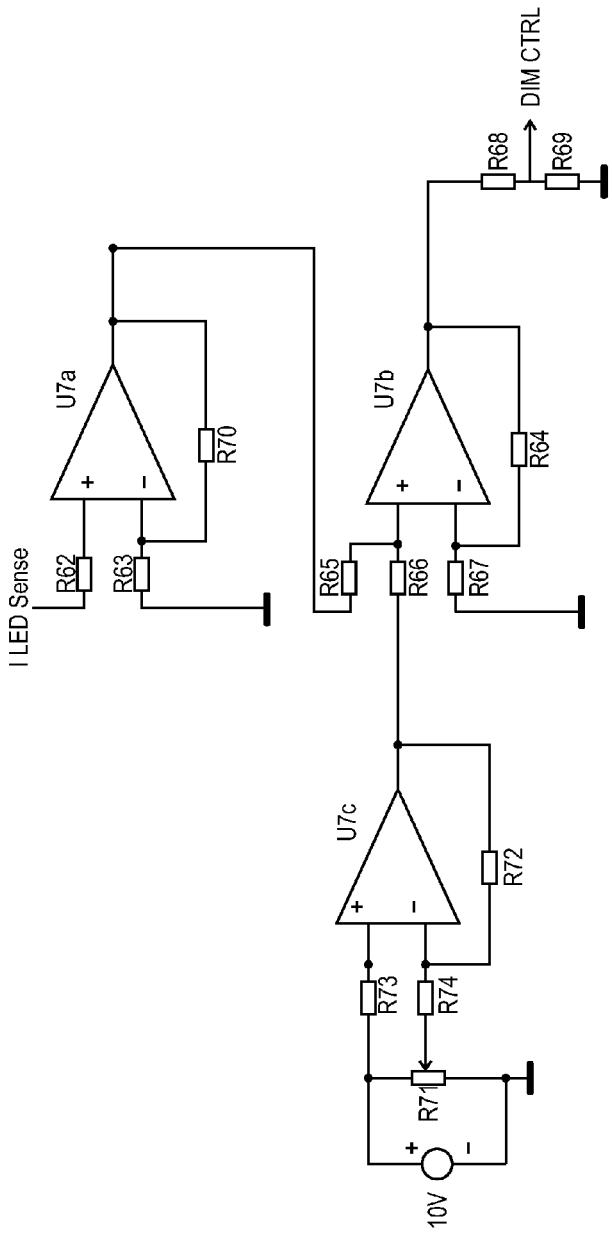
FIG. 7 is a schematic diagram of a second embodiment of a dimming control circuit portion of the LED driver circuit of FIG. 1.
Figure 8:
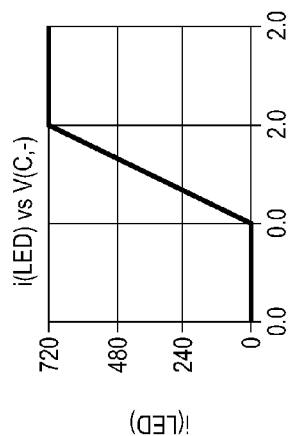
FIG. 8 is a graph illustrating the relationship between output (load) current and second source control (signal) voltage for the LED driver circuit of FIG. 1 with the dimming control circuit of FIG. 7.

Typical 0-10V low voltage dimming control, for example, using a TRIAC dimmer control, can be incorporated into a second illustrative embodiment of a dimming control circuit 40 as shown in FIG. 7. To keep the 0-10V dimming control simple, an Op Amp U7C and resistors R72, R73, and R74 are added over the first illustrative embodiment, and resistor R71 is moved to the Op Amp U7C inverting input. Resistor values can be R72=2 k and R73=R74=10 k. This provides a gain of Op Amp U7C, GC=0.2. Thus when the inverting input of Op Amp U7C is in the range of 0 to 10V, output of Op Amp U7C, the dimming control signal, is 2.0 to 0V, the same range as for FIG. 4. The arrangement and operation of Op Amp U7A and U7B and the remainder of the circuit are the same as that for Op Amp U6A and U6B of FIG. 4. Table 2 illustrates the voltage relationships for the 0-10V dimming control circuit. FIG. 8 illustrates the relationships between the 0-10V dimming control voltage and the output (LED load) current.

TABLE 2

Voltage relationships for 0-10 V dimming control circuit:

| I (LED) | Sense(A) | V(U7C, −) | V(C, out) | V (Line) |
|---|---|---|---|---|
| 0 | 0 | 0.0 | 2.0 | 0.0 |
| 0 | 0 | 0.0 | 2.0 | 50.0 |
| 720 mA | 200 mV | 2.0 | 0.0 | 100.0 |
| 720 mA | 200 mV | 2.0 | 0.0 | 150.0 |

High Voltage TRIAC Dimming Control Circuit

Figure 9:
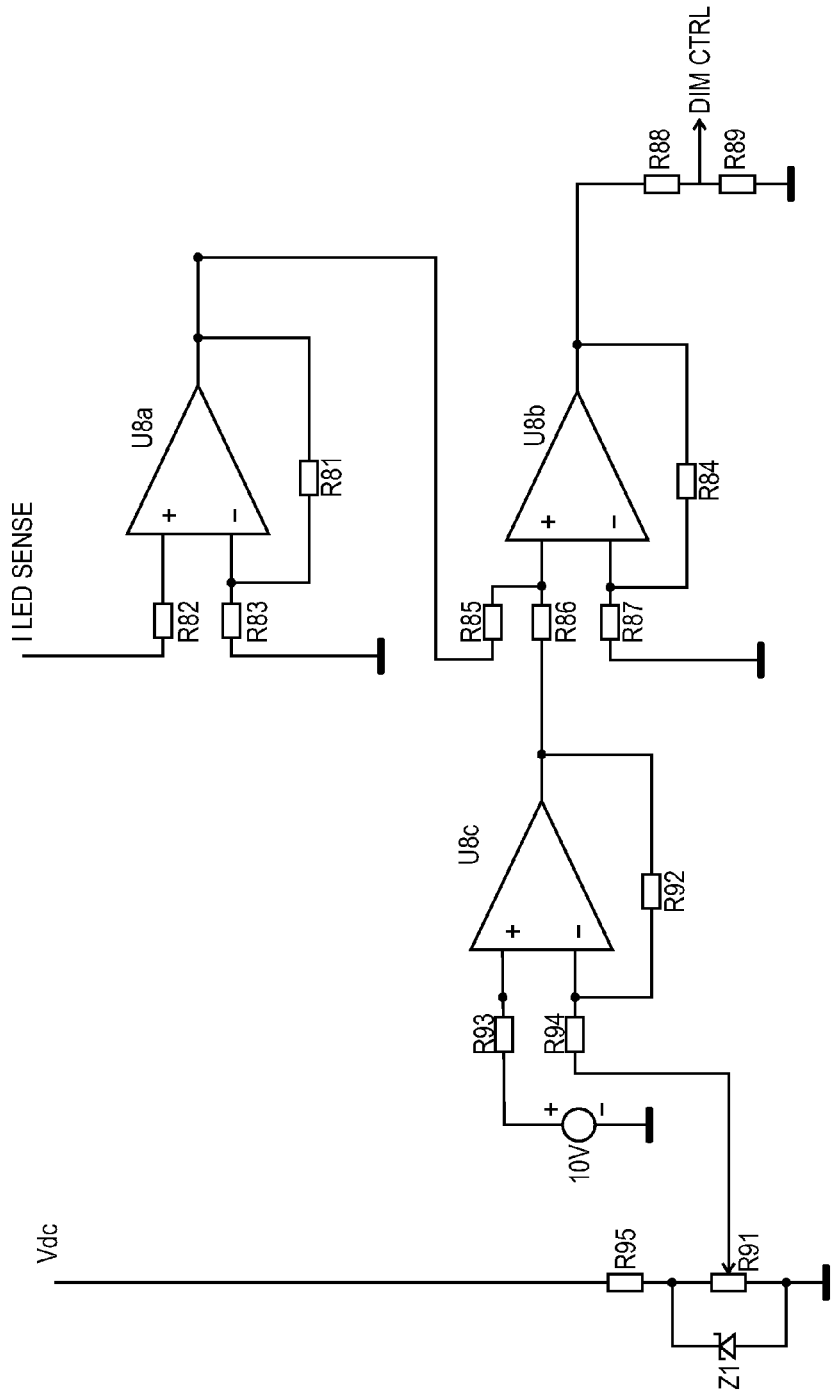
FIG. 9 is a schematic diagram of a third embodiment of a dimming control circuit portion of the LED driver circuit of FIG. 1.

Using a rectified voltage VDC from the main circuit and a voltage divider to replace the 0-10V control signal, a third embodiment of an illustrative dimming control circuit 40 can be developed easily from the second embodiment. For example, the third embodiment of a dimming control circuit illustrated in FIG. 9 provides for TRIAC dimming control using a high voltage limit.

Resistor R95 can have a value 10 times that of R91; therefore, when the DC rectifier voltage is 100V, the voltage at resistor R94 is 10V. Diode Z1 can be a 10V, 1% zener diode. When the DC rectifier voltage is above 100V, diode Z1 limits the maximum value to 100V. If a gain of Op Amp U8C is 0.2, then the output of Op Amp U8C, the dimming control signal, is 2.0 to 0V, the same range as for FIGS. 7 and 8. The arrangement and operation of Op Amp U8A and U8B and the remainder of the circuit are the same as that for Op Amps of FIGS. 4 and 7.

Microcontroller Dimming Control Circuit

Figure 10:
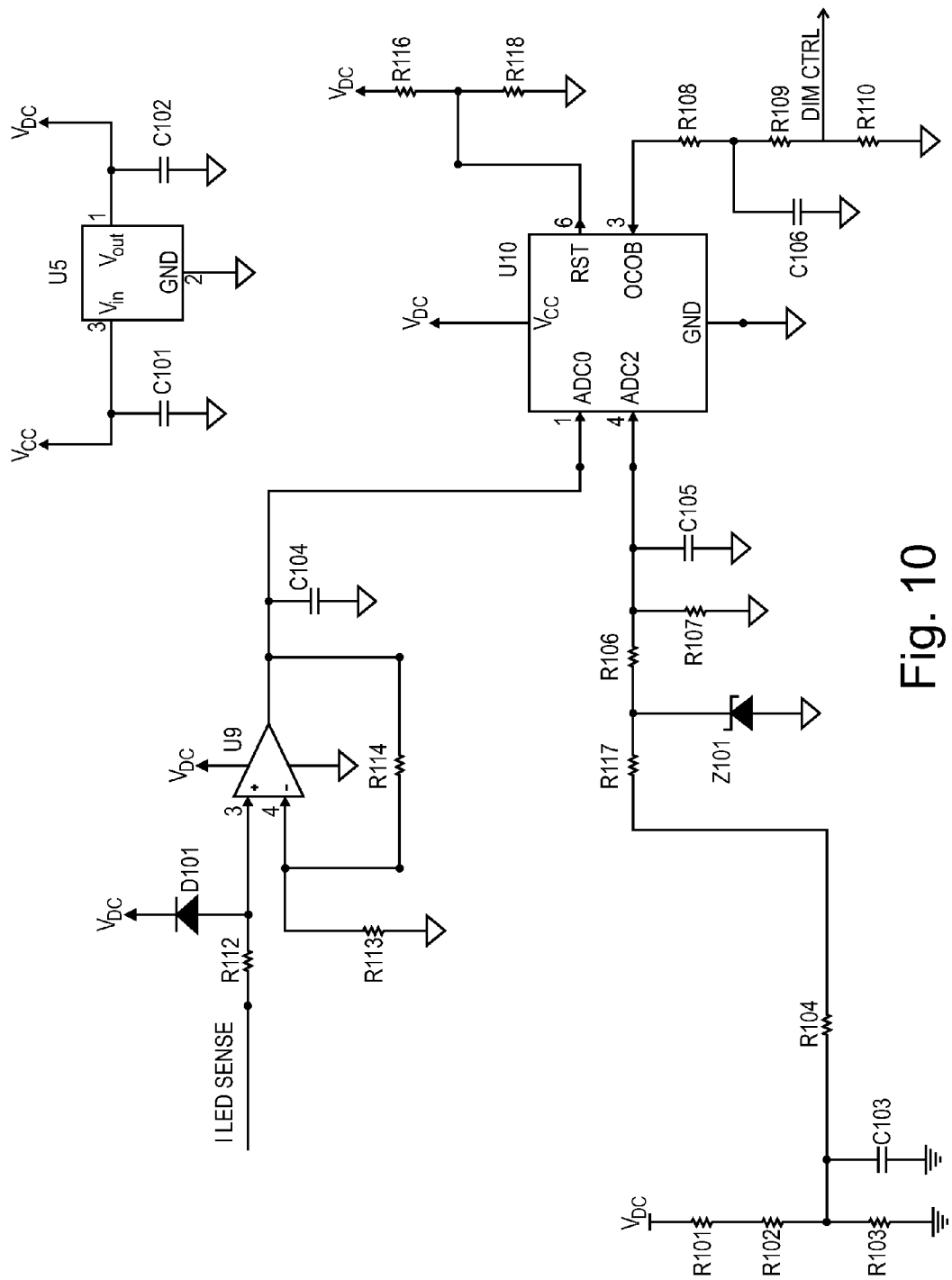
FIG. 10 is a schematic diagram of a fourth embodiment of a dimming control circuit portion of the LED driver circuit of FIG. 1.

Advantageously, using a microcontroller and software code instead of some hardware circuit components can greatly simplify the dimming control circuit 40 design and easily add more functions. FIG. 10 illustrates a fourth embodiment of an illustrative dimming control circuit 40 using a microcontroller U10. A low cost, small package and pin count microcontroller U10 can be used, for example, the ATtiny10-TS8R, available from Atmel Corp. of San Jose, Calif. A voltage regulator U5 can be used to provide a voltage supply for the microcontroller U10 and Op Amp U9.

While the invention has been illustrated and described in detail in the foregoing drawings and description, the same is to be considered as illustrative and not restrictive in character, it being understood that only illustrative embodiments thereof have been shown and described and that all changes and modifications that come within the spirit and scope of the invention as defined in the claims and summary are desired to be protected.

The invention claimed is:

1. An LED driver circuit, comprising:
   a flyback converter, the output of the LED driver circuit provided by the flyback converter;
   a primary controller for controlling the flyback converter;
   a secondary controller providing output feedback to the primary controller;
   an output current sensing circuit; and
   a dimming control circuit coupled to the output current sensing circuit, the dimming control circuit providing a sensed current signal, a selectable dimming control signal, and a summed control signal, the summed control signal being the sum of the sensed current signal and dimming control signal; and
   wherein the summed control signal is coupled to the secondary controller.

2. The LED driver circuit of claim 1, wherein the primary controller is a PFC controller.

3. The LED driver circuit of claim 1, wherein the secondary controller is a voltage and current controller.

4. The LED driver circuit of claim 1, wherein the primary and secondary controllers operate to adjust a current output based on the summed control signal.

5. The LED driver circuit of claim 4, wherein the dimming control signal is selectable between a range of zero and the value of the maximum sensed current signal.

6. The LED driver circuit of claim 1, wherein the primary and secondary controllers operate to provide a current output that is reduced by the ratio of the dimming signal over the maximum sensed current signal.

7. The LED driver circuit of claim 1, wherein each of the sensed current signal, dimming control signal, and summed control signal comprise a voltage level.

8. The LED driver circuit of claim 7, wherein the sensed current signal is provided as a control voltage output by a non-inverting op amp coupled to output current sensing circuit, and the summed control signal is a control voltage output of a summing op amp coupled to the sensed current signal and the dimming control signal.

9. The LED driver circuit of claim 1, wherein the output current sensing circuit includes a shunt resister on the low-side of the output of the LED driver circuit.

10. The LED driver circuit of claim 1, wherein the dimming control signal varies between 0V and the voltage of the summed control signal for which a desired maximum current output is provided by the LED driver circuit.

11. The LED driver circuit of claim 1, wherein:
   a summed control signal of 200 mV provides a desired maximum current output; and
   the dimming control signal varies between 0 and 200 mV.

12. The LED driver circuit of claim 1, further comprising a 0-10V dimming input signal and wherein the dimming control circuit include an op amp configured to scale the dimming input signal to a desired voltage range for the dimming control signal.

13. The LED driver circuit of claim 1, further comprising:
a TRIAC dimming input signal; and
an op amp configured to scale the TRIAC dimming input signal to a desired voltage range for the dimming control signal.

14. An LED driver circuit, comprising:
a transformer coupled switching regulator including a power driver coupled to a primary winding of the transformer;
an output coupled to a secondary winding of the transformer;
a primary controller for controlling the power driver;
a secondary controller providing output feedback to the primary controller;
an output current sensing circuit; and
a dimming control circuit coupled to the output current sensing circuit and the secondary controller.

15. The LED driver circuit of claim 14, wherein the dimming control circuit provides a sensed current signal, a selectable dimming control signal, and a summed control signal, the summed control signal being the sum of the sensed current signal and dimming control signal, and the summed current signal providing a current control signal to the secondary controller.

16. The LED driver circuit of claim 15, where the transformer coupled switching regular is a flyback converter and the primary controller is a PFC controller.

17. The LED driver circuit of claim 15, wherein the dimming control signal is selectable between a range of zero and the value of the maximum sensed current signal.

18. The LED driver circuit of claim 15, wherein the primary and secondary controllers operate to provide a current output that is reduced by the ratio of the dimming signal over the maximum sensed current signal.

19. The LED driver circuit of claim 15, wherein the sensed current signal is provided as a control voltage output by a non-inverting op amp coupled to output current sensing circuit, and the summed control signal is a control voltage output of a summing op amp coupled to the sensed current signal and the dimming control signal.

20. The LED driver circuit of claim 15, wherein the dimming control signal varies between 0V and the voltage of the summed control signal for which a desired maximum current output is provided by the LED driver circuit.

* * * * *